F. A. CALLEY.
APPARATUS FOR BAKING BEANS.
APPLICATION FILED MAY 5, 1908.

909,988.

Patented Jan. 19, 1909.

Witnesses:
Arthur C. Randall
Edward Maxwell

Inventor:
Freeman A. Calley,
by Geo. H. Maxwell,
Atty.

UNITED STATES PATENT OFFICE.

FREEMAN A. CALLEY, OF FRANKLIN, NEW HAMPSHIRE.

APPARATUS FOR BAKING BEANS.

No. 909,988.  Specification of Letters Patent.  Patented Jan. 19, 1909.

Application filed May 5, 1908. Serial No. 430,966.

*To all whom it may concern:*

Be it known that I, FREEMAN A. CALLEY, a citizen of the United States, and resident of Franklin, in the county of Merrimack and State of New Hampshire, have invented an Improvement in Apparatus for Baking Beans, of which the following description, in connection with the accompanying drawings, is a specification, like letters on the drawings representing like parts.

Baked beans are usually prepared by placing the beans, in a parboiled condition, together with a piece of pork and other ingredients, in an earthen pot, which is then placed in an oven and baked for such length of time as may be found to be necessary by repeated observation of the baking beans. There are various objections to this usual method of baking beans, among which are the liability of burning the beans, and the necessity of constant attention, and accordingly my invention has for its main objects the provision of means whereby these objections are eliminated. Also my apparatus produces a superior product, and is moreover extremely neat, inexpensive, hygienic, and convenient.

In carrying out my invention, the beans, pork, etc., contained in a suitable open receptacle, are surrounded by a substantially sealed steam bath or jacket of superheated steam until the baking is finished, and in the preferred form of my invention I provide means whereby the latter may be visually determined without exposing the beans.

Figure 1:
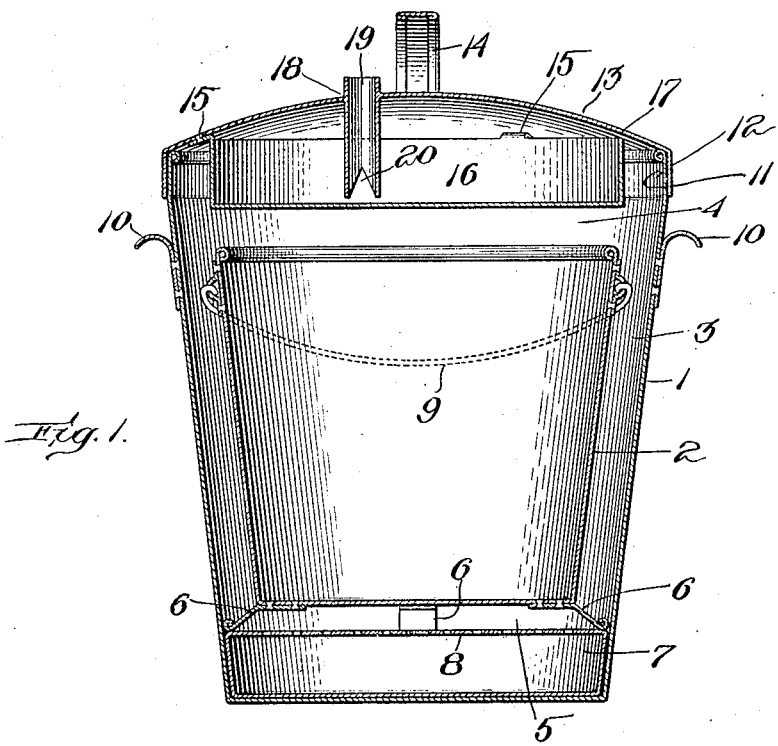
Figure 2:
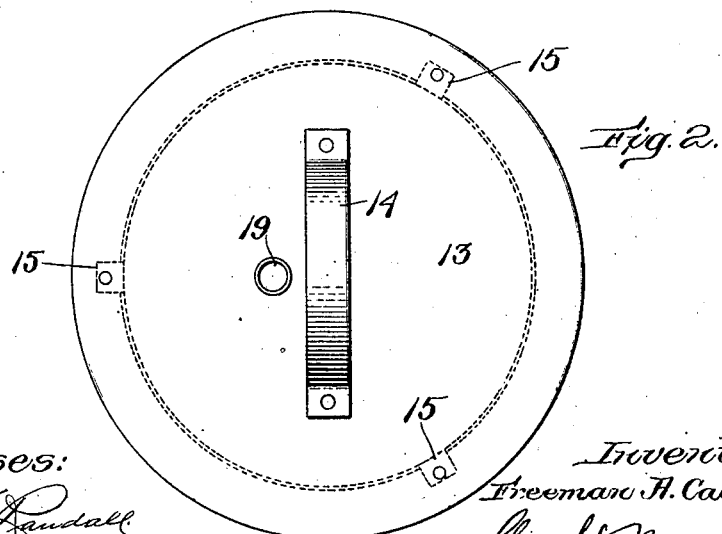

In the drawings, Figure 1 is a central vertical sectional view of a preferred embodiment of my apparatus; and Fig. 2 is a top plan view thereof.

In an outside can or bucket 1, preferably made tapering and seamless, I mount a substantially similarly shaped receptacle 2 of such size and shape as to insure an intervening space 3 extending uniformly between the cans 1 and 2 entirely around the latter. The can or receptacle 2 is of such a length that a similar space 4 is provided above the top thereof and a space 5 at the bottom thereof. In other words the receptacle 2 is entirely surrounded by a normally unoccupied space between it and the outside can or bucket 1. The receptacle 2 is provided with legs 6 or other suitable supporting means preferably extending downwardly and outwardly so as to center the receptacle 2 properly within the containing vessel or can 1. As herein shown I provide a removable bottom tank or water carrier 7 having a perforated top 8 on which the receptacle 2 sits. The latter is provided with a bail 9 or other suitable means by which it may be carried, and the can 1 has handles 10 for the same purpose. The can 1 terminates adjacent its upper edge in a cylindrical rim or portion 11, over whose outer surface snugly fits a cylindrical depending flange 12 of a cover 13, this construction being provided for the purpose of insuring a steam-tight joint when the apparatus is in the oven. As the can 1 sits in direct contact on the bottom of the oven it tends to expand slightly more than the cover, so that the flange 11 soon expands so as to fit immovably against the flange 12, with the result that the desired tight joint is secured, and yet when the apparatus is taken out and permitted to cool off the cover can be readily removed. The cover has a handle 14 for its removal. On the under side of the cover I rivet or otherwise secure at a plurality of places 15 a depending water tank 16 separated slightly from the adjacent top portion of the cover as indicated at 17, so as to permit the escape of steam from said tank when the water therein is raised to a sufficient temperature. Secured at 18 to the cover is a testing tube 19 which extends down to, or nearly to, the bottom of the tank 16, and is preferably provided with a vent, herein shown as a notch 20, for a purpose presently described.

The user first packs the receptacle 2 with the pork and parboiled beans, etc., the same as the ordinary bean pots have heretofore been filled. If the bottom tank 7 is used, it is then filled with water and placed in the bottom of the can or bucket 1, and the filled receptacle 2 is then put in place thereon, as shown in Fig. 1. Preferably the tank 7 is used, as shown, thereby giving somewhat better results, although, especially in small sizes, it may be omitted. The top tank 16 of the cover is then filled with water, preferably, although not necessarily, boiling, and is fitted tight down upon the can or bucket 1. The apparatus is then put into the oven. The heat of the oven quickly begins to transform the water into steam, and at the same time expands the can or bucket 1 so as to make an absolutely tight joint between its upper rim and the cover. This, together with the fact that the lower end of the testing tube 19 is submerged in the water of the tank 16, prevents the escape of the steam, which is retained within the apparatus and compelled to envelop the entire pail or receptacle of beans. The continuous high temperature, especially at the bottom, quickly superheats this enveloping jacket of steam, and the moisture therefrom gradually penetrates and permeates the mass of beans etc. in the receptacle 2 until they are thoroughly and completely baked. The enveloping jacket of steam makes it impossible for the beans to become burned in the slightest, and the fact that the beans are baked in the presence of more or less moisture produces a fine delicate flavor. As no water whatever is put into the beans, but they are permitted to absorb only such moisture as may be derived from the steam, they have a mellowness and delicacy which I have not experienced in beans baked open in an oven in the way heretofore common. Also the beans maintain their individual or separated condition, and are not liable to mush together as is frequently the case when otherwise baked. When the tank 7 is not used, the steam superheats more quickly and the extra heating of the steam at the bottom of the apparatus is more efficient.

My apparatus is exceedingly neat, as there is no incrusting of the beans on the apparatus, as has commonly been the case with the ordinary bean pots, but the presence of the enveloping steam keeps all the beans in uniform condition, and moreover retains the natural bean color even when the baking is finished, there being no liability of bleaching the beans as has heretofore been apt to be the case. After the beans have been baking about the requisite or usual length of time, the attendant runs a skewer or other stick down the testing tube 19, and if it shows that the water has been lowered to a certain predetermined point, then the beans are done. This point is arbitrarily determined. In the apparatus which I have constructed, I have made the tank 16 three-quarters of an inch deep, and have found that the beans are invariably done exactly right when there remains half an inch of water in the tank. The notch or aperture 20 extends upwardly to a distance slightly less than this " finish point ", preferably one-quarter inch, so that if the attendant should neglect the apparatus, it will blow off and thereby destroy the steam pressure as soon as the water has lowered to this point. Ordinarily the pressure will be sufficient, in such event, to produce a sharp whistle of notification. The testing tube is also availed of for filling the tank 16 with water, but its primary purpose is to enable the user to ascertain, without removing the cover, when the beans are done. Aside from this mechanical convenience, one of the prime advantages of my invention is that it leaves just enough moisture in the beans when baked to make them the most palatable, not quite mealy, and yet not too moist or wet.

While my invention is primarily intended for baking beans and I have restricted my description thereto, it will be understood that it may readily be used for baking and cooking other articles. Also it will be understood that, unless otherwise expressly stated in the claim, I am not limited in all cases to the preferred construction which I have herein explained in detail.

Having described my invention, what I claim as new, and desire to secure by Letters Patent is:

The herein described apparatus, comprising a central receptacle for holding the material to be baked; a surrounding can of heat-conveying material; a cover for the latter provided on its under side with a depending water tank, opening adjacent its top into the interior of the can for the delivery of steam thereinto from the tank when generated by heat, and a testing tube tightly secured in said cover and having its lower end normally within said tank in position to be submerged when the latter is filled.

In testimony whereof, I have signed my name to this specification, in the presence of the subscribing witnesses.

FREEMAN A. CALLEY.

Witnesses:
AGNES L. GAHAGAN,
THOMAS F. CLIFFORD,
F. B. SAWYER.